(12) United States Patent
Kristensen et al.

(10) Patent No.: US 10,687,470 B2
(45) Date of Patent: Jun. 23, 2020

(54) GRAIN CLEANING SYSTEM IN A COMBINE HARVESTER

(71) Applicant: AGCO International GmbH, Neuhausen (CH)

(72) Inventors: Magnus Baltzer Kristensen, Randers (DK); Morten Leth Bilde, Langaa (DK)

(73) Assignee: AGCO International GmbH, Neuhausen (CH)

( * ) Notice: Subject to any disclaimer, the term of this patent is extended or adjusted under 35 U.S.C. 154(b) by 167 days.

(21) Appl. No.: 15/753,485

(22) PCT Filed: Aug. 30, 2016

(86) PCT No.: PCT/EP2016/070377
§ 371 (c)(1),
(2) Date: Feb. 19, 2018

(87) PCT Pub. No.: WO2017/042050
PCT Pub. Date: Mar. 16, 2017

(65) Prior Publication Data
US 2018/0235152 A1 Aug. 23, 2018

(30) Foreign Application Priority Data
Sep. 9, 2015 (GB) .................................. 1515948.6

(51) Int. Cl.
*A01F 12/44* (2006.01)
*A01F 12/52* (2006.01)
*A01F 12/30* (2006.01)

(52) U.S. Cl.
CPC .......... *A01F 12/448* (2013.01); *A01F 12/305* (2013.01); *A01F 12/446* (2013.01); *A01F 12/52* (2013.01)

(58) Field of Classification Search
CPC .... A01F 12/448; A01F 12/305; A01F 12/446; A01F 12/52
See application file for complete search history.

(56) References Cited

U.S. PATENT DOCUMENTS

| 1,531,608 A | 3/1925 | Gritzmacher |
| 2,732,941 A * | 1/1956 | Deiss ................... A01D 75/282 |
| | | D75/282 |

(Continued)

FOREIGN PATENT DOCUMENTS

| DE | 807726 C | 1/1955 |
| DE | 2112565 A1 | 11/1972 |

(Continued)

OTHER PUBLICATIONS

UK Intellectual Property Office, International Search Report for priority Application No. GB1515948.6, dated Feb. 29, 2016.

(Continued)

*Primary Examiner* — Arpad Fabian-Kovacs

(57) ABSTRACT

A grain cleaning system in a combine harvester including a frame, a chaffer sieve, and a lower sieve. A clean grain chute is located under the lower sieve to catch grain falling therefrom and is inclined to direct the caught grain to a clean grain trough. A tailings return chute is disposed under the clean grain chute and is configured to direct tailings to a tailings collection trough. A multi-configurable plate is mounted to the frame and positioned under a rear portion of the chaffer sieve. The plate is moveable between different operating positions. In a first operating position the plate is configured to guide material incident thereon to the tailings return chute. In a second operating position the plate is configured to guide material incident thereon to the clean grain chute.

8 Claims, 4 Drawing Sheets

(56) References Cited

U.S. PATENT DOCUMENTS

| | | | | |
|---|---|---|---|---|
| 3,593,719 | A * | 7/1971 | Ashton | A01F 12/00 460/73 |
| 3,847,160 | A * | 11/1974 | De Coene | A01D 41/02 460/97 |
| 4,968,285 | A * | 11/1990 | Schuhmacher | A01F 12/52 460/8 |
| 7,066,810 | B2 * | 6/2006 | Farley | A01D 41/1243 460/112 |
| 7,413,507 | B2 * | 8/2008 | Weichholdt | A01F 12/446 460/100 |
| 7,841,931 | B2 * | 11/2010 | Straeter | A01D 75/282 460/101 |
| 9,521,808 | B2 * | 12/2016 | Farley | A01F 12/446 |
| 2014/0066145 | A1 * | 3/2014 | Bilde | A01F 12/444 460/91 |
| 2014/0128133 | A1 * | 5/2014 | Claerhout | A01F 12/446 460/101 |
| 2014/0370947 | A1 * | 12/2014 | Bilde | A01F 12/44 460/91 |

FOREIGN PATENT DOCUMENTS

| | | |
|---|---|---|
| EP | 2208412 A | 7/2010 |
| FR | 703326 A | 4/1931 |
| FR | 2073993 A5 | 10/1971 |
| FR | 2359573 A1 | 2/1978 |
| GB | 620428 A | 3/1949 |
| JP | H10117574 A | 5/1998 |
| WO | 2014/082890 A | 6/2014 |

OTHER PUBLICATIONS

European Patent Office, Internatiional Search Report for parent WO Application No. PCT/EP2016/070377, dated Oct. 14, 2016.

* cited by examiner

GRAIN CLEANING SYSTEM IN A COMBINE HARVESTER

BACKGROUND OF THE INVENTION

Field of Invention

The invention relates to combine harvester grain cleaning systems which are disposed downstream of threshing and separating apparatus.

Description of Related Art

Combine harvesters are commonly used by farmers to harvest grain and seeds from crop fields. The processes carried out by the combine harvester to thresh, separate and clean the grain are well established.

Threshing and separating apparatus are employed to separate the grain or seeds from the cut crop material. The separated material comprises a mix of grain, chaff and unthreshed tailings. This material is then conveyed to a grain cleaning system or 'shoe' typically by an oscillating grain pan having a rear discharge edge from where the material falls.

The falling grain and MOG (material other than grain) is subjected to a cleaning airstream which is generated by a fan so that the lighter MOG-rich material is propelled rearwardly out of the machine. The heavier grain-rich material is incident upon an upper sieve (or chaffer sieve) which oscillates so as to convey the material rearwardly. The chaffer sieve is provided by adjustable louvres which allows the grain to pass through whilst the larger MOG is carried to the rear of the chaffer sieve and out of the machine.

A lower sieve is arranged below the chaffer sieve to catch material falling through the chaffer sieve. The lower sieve is similarly driven in an oscillating manner to convey the material in a generally rearward direction whilst allowing grain to fall there through onto a first chute which directs the clean grain to a clean grain trough for onwards conveyance to a grain tank. Material falling from the rear edge of the lower sieve and through a rear portion of the chaffer sieve falls into a second chute which serves to direct the material caught thereby to a tailings collection trough for onwards conveyance to a re-threshing system.

When harvesting some crops such as corn and beans it is desirable for as little material as possible to pass through the re-threshing system which is known to cause grain damage. It is known to provide a removable cover which is inserted from the rear of the cleaning system and serves to cover or blank off access to the second chute and divert the crop material incident thereon into the first chute thereby preventing any crop material passing through the re-thresher.

The procedure for installing or removing such a 'tailings cover' in known machines is cumbersome and time consuming. This results in the operator often choosing to harvest with a sub-optimal set-up or alternatively losing valuable time whilst the reconfiguration is made.

SUMMARY OF INVENTION

It is an object of the invention to provide a grain cleaning system with the facility to blank off the tailings return chute in a less time consuming and cumbersome manner.

According to the invention there is provided a grain cleaning system in a combine harvester comprising a frame, a chaffer sieve operable to convey harvested crop material in a generally rearward direction to a first discharge edge, a lower sieve arranged below the chaffer sieve to catch material falling through the chaffer sieve and being operable to convey caught crop material in a generally rearward direction to a second discharge edge located forwardly and below the first discharge edge, a first chute disposed under the lower sieve to catch grain falling therefrom and being inclined to direct the caught grain to a clean grain trough, a second chute disposed under the first chute and configured to direct tailings to a tailings collection trough, and a multi-configurable plate mounted to the frame and positioned under a rear portion of the chaffer sieve, wherein the plate is moveable between a first operating position in which the plate is configured to guide material incident thereon to the second chute, and a second operating position in which the plate is configured to guide material incident thereon to the first chute.

By mounting a multi-configurable plate to the frame in a manner which allows an operator to move the plate between the first and second operating positions, the cleaning system can be quickly and simply reconfigured to cater for different crops and without the need to install or remove components. As a result the down time of the machine is reduced.

When the plate is in the first operating position, MOG falling onto the rear of the plate from the rear of the lower sieve and through a rear section of the chaffer sieve is directed into the tailings collection trough for onward conveyance to a re-threshing system. When the plate is in the second operating position, MOG falling onto the rear of the plate from the rear of the lower sieve and through a rear section of the chaffer sieve is directed into the clean grain trough for onwards conveyance to a grain tank.

In a preferred embodiment the plate is pivotally mounted to the frame so as to be pivotable around a first pivot axis between the first and second operating positions. The first pivot axis is preferably proximate to the rear edge of the plate and may align with the rear edge of the plate. The front edge of the plate can, therefore, be lifted and lowered between the first and second operating positions as required. The plate may be pivotally mounted to the frame by any suitable means such as a simple hinge mechanism or one or more retractable rods which are received in cooperating holes formed in the frame.

The plate may be pivotable into a third position in which the front edge of the plate is raised beyond the first operating position so as to present an access opening to the lower sieve for inspection for example.

The frame preferably comprises a pair of side walls between which the lower sieve, first chute, and second chute are disposed. The frame together with the lower sieve and first and second chutes may oscillate together as a unitary "shaker shoe" assembly. The chaffer sieve may have a dedicated frame which oscillates independently or with the shaker shoe.

Preferably, a latching mechanism is provided to selectively latch the plate to the frame in the first and second operating position to prevent relative movement of the plate with respect to the frame during oscillation. The latching mechanism is preferably located towards a front portion of the plate and may comprise for example a laterally shiftable locking member which engages with one or two of the side walls. The latching mechanism may be manually operable or automated with a suitable actuator and control system. In one embodiment the latching mechanism comprises a pair of laterally extending rods which are coupled at an inner end to a rotating member, wherein rotation of the rotating member causes the rods to extend outwardly and engage in receiving holes formed in the frame. The latching mechanism is preferably disposed on an underside of the plate to avoid interference with the crop material flow.

A latching mechanism disposed at the front of the plate preferably fastens the plate to the side walls so as to provide a second pivot axis which is proximate to the front edge of plate. A further, rear, latching mechanism may then be provided to latch the rear of the plate to at least one of the side walls and permit pivoting around the second pivot axis when the rear latching mechanism is disengaged. With the front latching mechanism engaged the rear edge of the plate may be pivotable around the second pivot axis into a fourth position by withdrawing the rear latching mechanism and lower the rear edge of the plate to permit inspection of the underside of the chaffer sieve through an opening at the rear of the cleaning system.

One or more external user-operable levers may be coupled to the plate for moving the plate between the various operating positions.

BRIEF DESCRIPTION OF DRAWINGS

Further advantages of the invention will become apparent from reading the following description of specific embodiments with reference to the appended drawings in which:—

DETAILED DESCRIPTION OF SPECIFIC EMBODIMENTS

Figure 1:
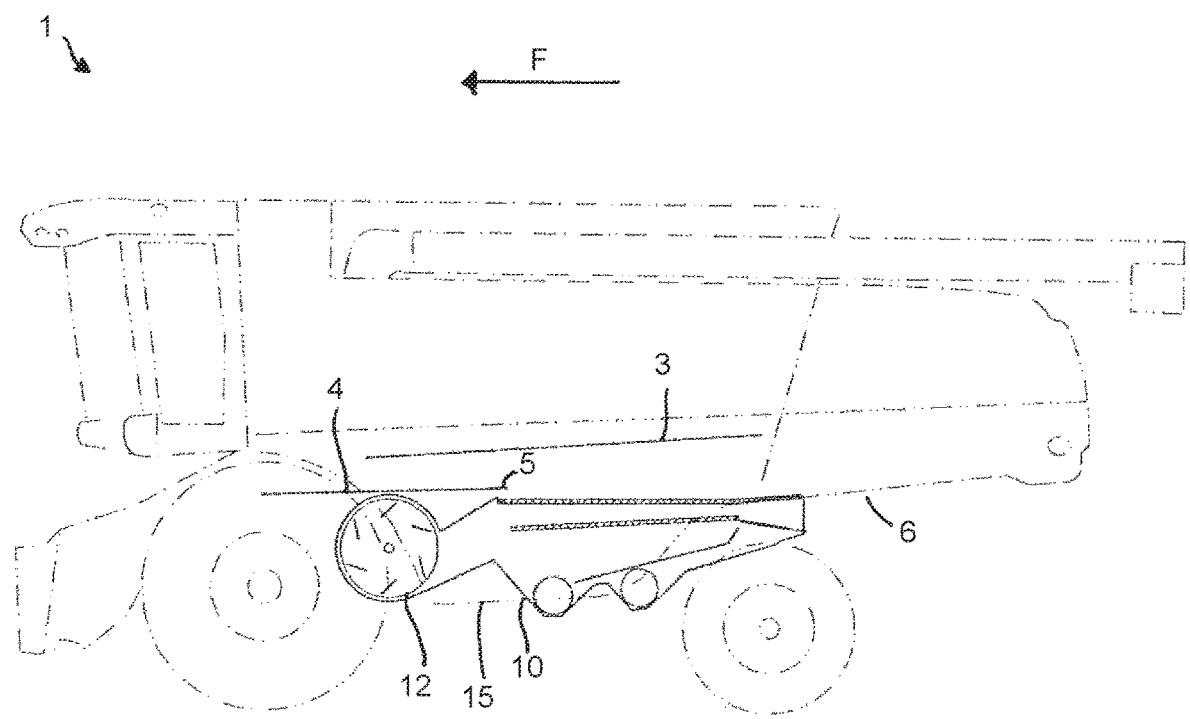
FIG. 1 is a side view of a combine harvester revealing, in schematic form, a grain cleaning system in accordance with the invention.
Figure 2:
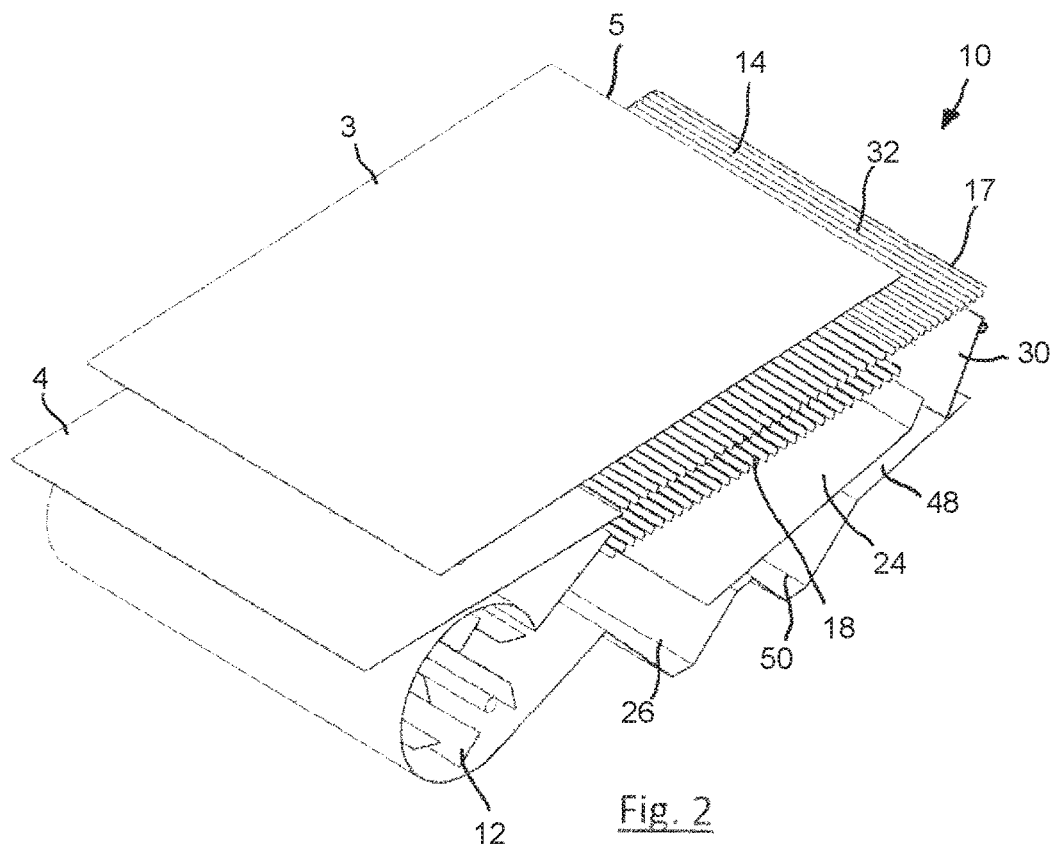
FIG. 2 is a perspective view of the grain cleaning system of FIG. 1 showing the multi-configurable plate in a 'normal' or first operating position.

With reference to FIG. 1, a self-propelled combine harvester 1 is shown in ghost form. Shown without a cutting header, the combine 1 is driven across crop fields in a forward direction indicated by arrow F. The combine 1 includes threshing and separating apparatus from which separated material comprising grain and MOG falls onto a return pan 3 and a grain pan 4 which are driven in oscillation to convey the caught grain and MOG in a known manner to a rear discharge edge 5 from where the material falls into a grain cleaning system or shoe 10.

It should be understood that relative terms used in the following description such as forward, rearward, longitudinal, lateral, transverse and vertical are made with reference to the normal forward direction F of travel of the combine 1.

Straw residue discharged by the threshing and separating apparatus exits the machine at the rear 6.

The grain cleaning system 10 is shown in solid line form in FIG. 1 and serves to clean the separated crop material, the crop material comprising a mixture of grain and MOG. The cleaning system 10 cleans the grain using well established principles using a cleaning airstream and oscillating sieves.

A cleaning air stream X (FIG. 3) is generated by a fan 12 which is journaled for rotation to the frame 15 of the combine 1. The air stream X is directed generally rearwardly and upwardly through the shoe 10 by baffles so as to propel lighter material out of the rear of the machine whilst allowing the heavier grain-rich material to settle initially on a chaffer sieve 14.

The chaffer sieve 14 has a supporting structure (not shown) which oscillates with respect to the frame 15 so as to convey the grain and MOG resting thereon in a generally rearward direction. Chaffer sieve 14, as in known combines, comprises laterally extending louvres 16 which are adjustable around a transverse pivot axis so as to adjust the spacing or gap therebetween and cater for different harvesting conditions and crops. Material which does not pass between the louvres and is conveyed rearwardly falls from a rear discharge edge 17 and is dispensed onto the ground below.

Figure 7:
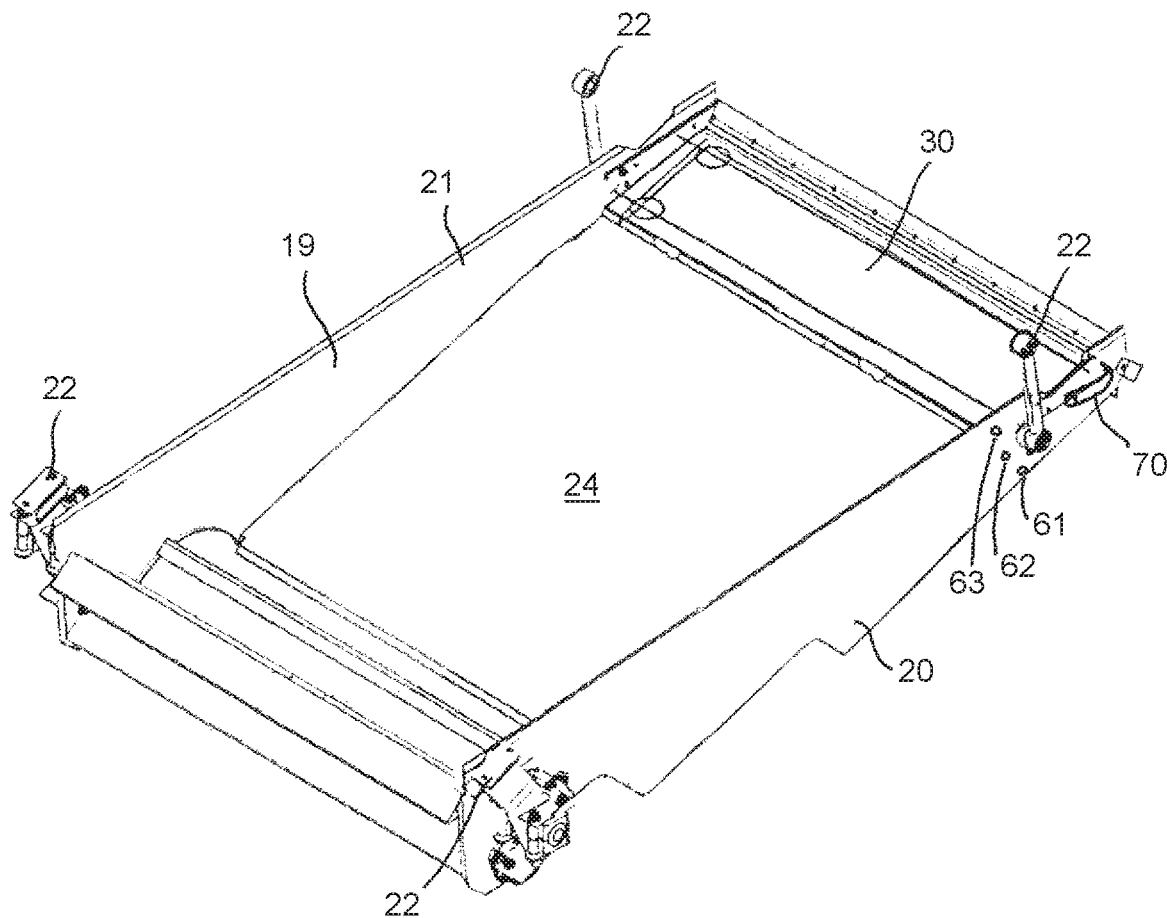
FIG. 7 is a perspective view of the grain cleaning system of FIG. 1 with the sieves omitted to reveal the clean grain chute.

A lower sieve 18 is arranged below the chaffer sieve 14 and serves to catch material falling through the chaffer sieve 14. Lower sieve 18 is secured between two side walls 19, 20 of a cleaning shoe frame assembly (FIG. 7), hereinafter referred to a shaker frame 21. The shaker frame 21 is suspended from the combine frame 15 by a set of hangers 22 and is driven in oscillation during operation in a known manner. Although the chaffer sieve 14 is supported by a separate supporting frame (not shown), it is envisaged that the chaffer sieve 14 may additionally be secured between the side walls 19, 20 of the shaker frame 21 in an alternative embodiment.

Lower sieve 18 also comprises a plurality of adjustable transverse louvres. The louvres are typically adjusted to permit grain to pass through onto an underlying clean grain chute 24. Larger material (such as tailings) which does not pass through the lower sieve 18 is conveyed rearwardly to a second discharge edge 25.

Clean grain chute 24 is inclined forwardly so that clean grain incident thereon is directed by gravity in a generally forward direction into a clean grain trough 26 which is oriented transversely across the machine. A cross-auger 27 is journaled for rotation inside the clean grain trough 26 and serves to convey the collected grain to a clean grain elevator (not shown) located on the right-hand side of the machine which carries the grain to an on-board tank (also not shown).

The floor of the clean grain chute 24 is embodied in the shaker frame 21.

In accordance with the invention a multi-configurable plate 30 is secured between the side walls 19, 20 in a location below a rear portion 32 of chaffer sieve 14. The rear portion 32 of chaffer sieve 14 is defined as extending rearwardly from a hypothetical vertical transverse plane which is in line with the second discharge edge 25 to the first discharge edge 17.

The multi-configurable plate 30 is secured between the side walls 19, 20 in a manner which allows the plate to be reconfigured in different position to perform different functions as required and as will be described below.

Figure 8:
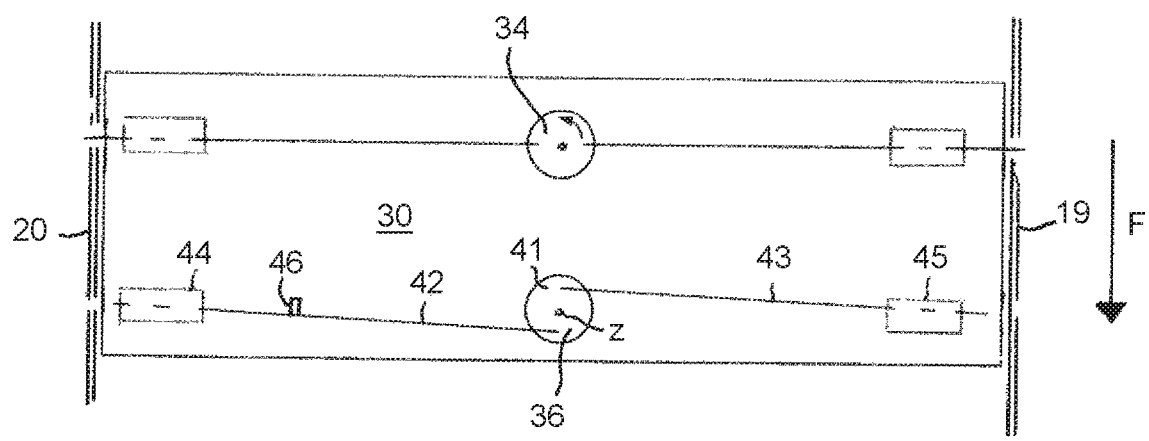
FIG. 8 is a schematic overhead view of the multi-configurable plate showing a front and rear latching mechanism in accordance with an embodiment of the invention.

Turning attention to FIG. 8, and by way of example, plate 30 is secured between side walls 19, 20 by a rear latching mechanism 34 and a front latching mechanism 36 which are disposed on the underside of plate 30. Viewed from underneath in FIG. 8, the rear latching mechanism 34 is shown as engaged whereas the front latching mechanism 36 is shown as disengaged. It should be understood that this view is for illustrative purposes only and both the front and rear mechanisms 34, 36 can be disengaged or engaged independently from one another.

Each latching mechanism 34, 36 is shown in schematic form and shown as having a similar construction. Taking the front latching mechanism 36 as an example, a disc 41 is rotatably mounted to the underside of plate 30 in a front central region, the disc being rotatable about a vertical axis z. A pair of laterally extending rods 42, 43 each have an inner end pivotally connected to disc 41 and are retained against the underside of plate 30 by respective keepers 44, 45 secured to the underside of plate 30. The disc mechanism provides that the rods of each coupling mechanism are withdrawn or engaged simultaneously. A peg 46 may be provided on one rod 42 to enable an operator to manually selectively engage and disengage the latching mechanism. The front latching mechanism 36 is shown in the unlatched position in FIG. 8. By pushing peg 46 to the left to engage the outer end of rod 42 in side wall 20 the latching mechanism simultaneously engages the outer end of rod 43 in side wall 19 thereby securing both lateral sides of the plate 30.

With one of the two latching mechanisms 34, 36 disengaged whilst the other of the two latching mechanisms is in the latched position, the multi configurable plate is pivotable about an axis defined by the rods of the latched mechanism. This permits the plate to be moved between various operating positions to be described hereinafter.

Figure 3:
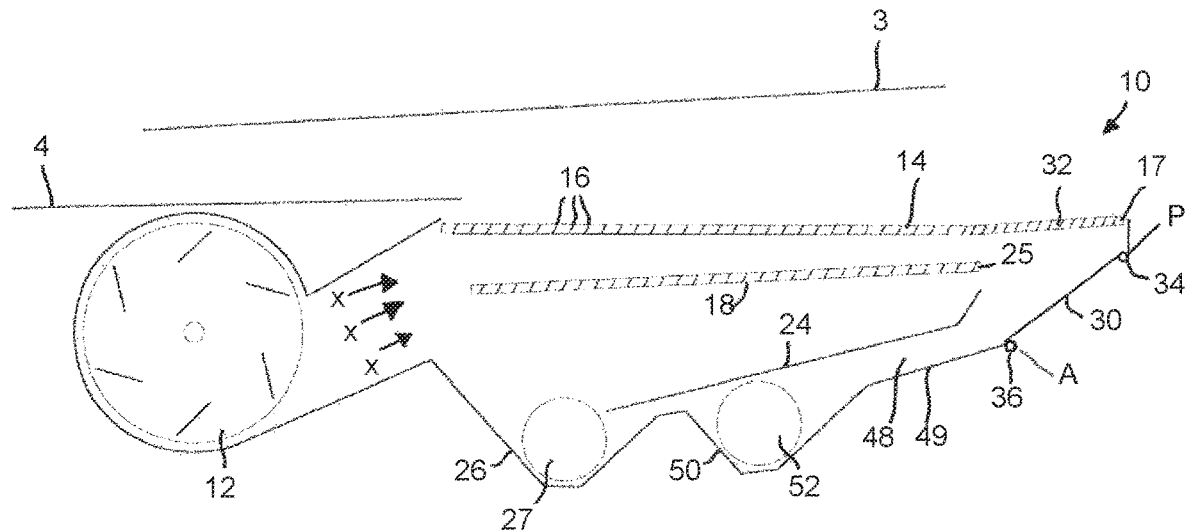
FIG. 3 is a side view of the grain cleaning system of FIG. 1 showing the plate in the 'normal' or first operating position.

Turning to FIG. 3 the plate 30 is shown in a first configuration in which material falling through the rear portion 32 of chaffer sieve 14 and from the discharge edge 25 of lower sieve 18 is caught and directed into a tailings return chute 48 which has a profiled floor 49 provided by frame 15. Tailings return chute 48 guides material to a tailings collection trough 50 in which is disposed a tailings cross auger 52 for carrying material away to a re-threshing system (not shown).

In this first position the rear latching mechanism 34 is engaged in a first position which determines a first pivot axis p. The front edge of plate 30 contacts the floor 49 of tailings return chute 48 and front latch mechanism 36 is shown latched in a lowered position 'A' so as to retain the front edge of plate 30 in this position during operation. Such a conventional configuration is selected by an operator to harvest crops which are not susceptible to damage from the re-threshing system such as cereals and grass seed.

Figure 4:
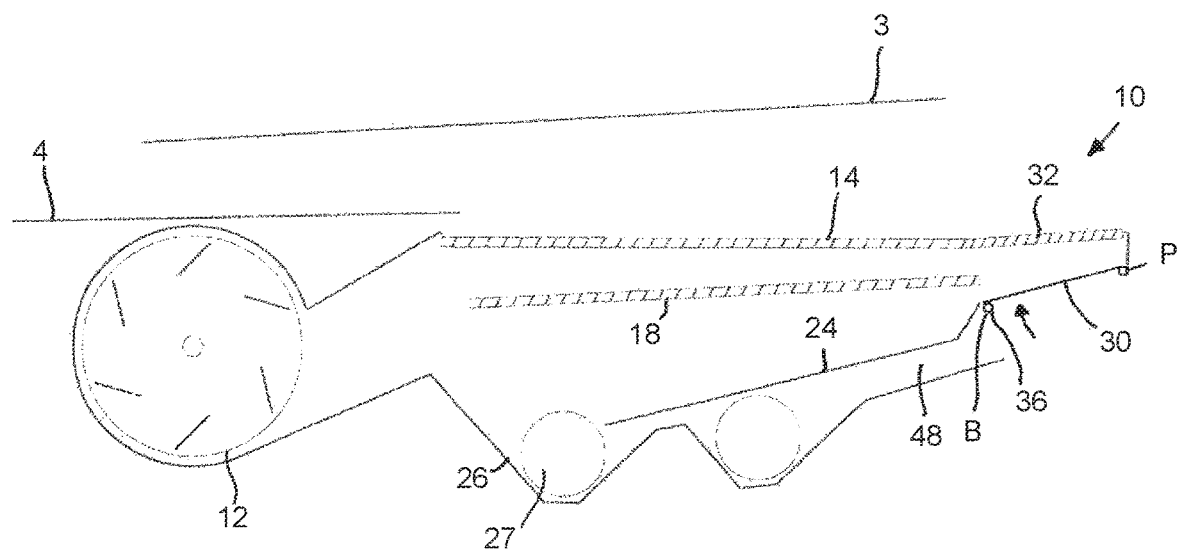
FIG. 4 is a side view of the grain cleaning system of FIG. 1 showing the plate in a 'blanking' or second operating position.

Turning to FIG. 4 the front edge of plate 30 can be pivoted upwardly into a second position in which the plate 30 serves the function of a tailings cover. To move plate 30 from the first position (FIG. 3) to the second position (FIG. 4) the front latching mechanism 36 must firstly be withdrawn and the front edge of plate 30 lifted upwardly before re-latching mechanism 36 in the new position 'B'. In this configuration crops such as corn which are susceptible to damage by the re-threshing system can be harvested without damage. It should be understood that the rear mechanism 34 provides pivot axis Y around which the plate 30 is pivoted between the first and second positions described.

Figure 5:
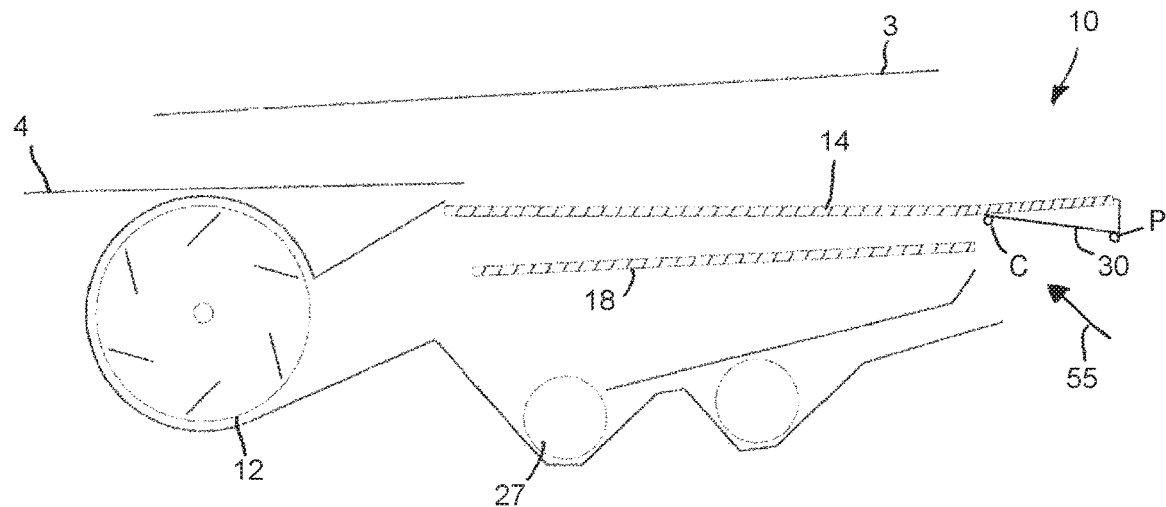
FIG. 5 is a side view of the grain cleaning system of FIG. 1 showing the plate in a 'lower sieve inspection' or third operating position.
Figure 6:
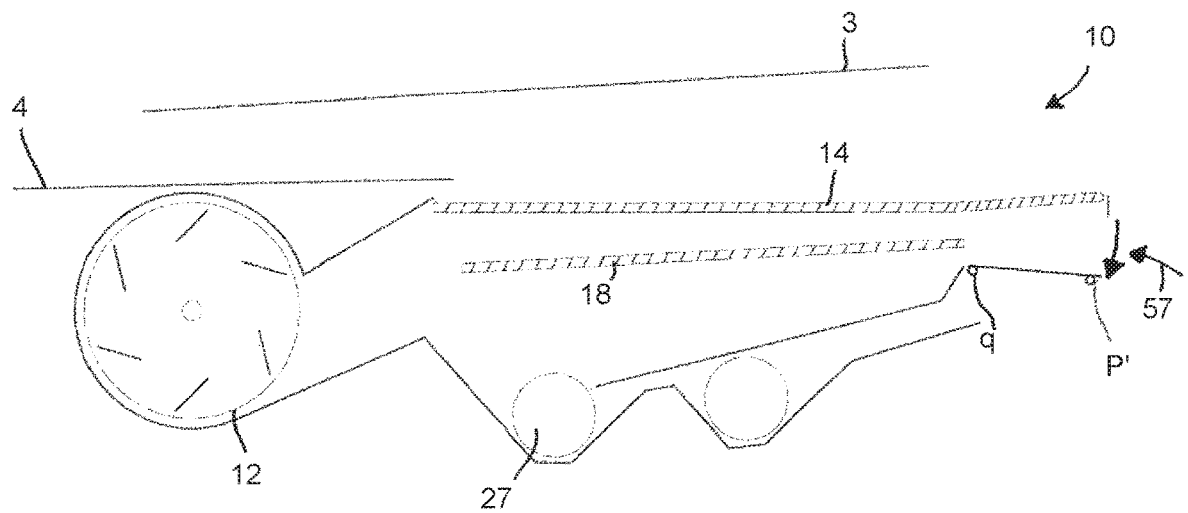
FIG. 6 is a side view of the grain cleaning system of FIG. 1 showing the plate in a 'chaffer inspection' or fourth operating position.

Turning to FIG. 5 the plate 30 can be reconfigured into a third position in which the front latching mechanism 36 engages the side walls in a raised position 'C' immediately under the chaffer sieve 14. This configuration provides an access opening 55 for an operator to clean or maintain the lower sieve 18 from the rear of the machine.

It should be understood that when in the first position (FIG. 3) the plate 30 provides a rear portion of the floor for tailings return chute 48. Therefore, the sheet material which forms part of frame 15, and in particular the floor 49, can be discontinuous at a rear section as in the illustrated embodiment. This discontinuation of the sheet material provides an access opening 55 when the plate 30 is in the third position as shown in FIG. 5.

It should be appreciated that the rods 42, 43 of front latching mechanism 36 selectively engage one of a plurality of holes 61, 62, 63 (FIG. 7) formed in the side walls 19, 20 of shaker frame 21 and correspond with positions A, B and C respectively.

The front latching mechanism 36 can also provide a pivot axis around which the plate 30 can be moved. Starting from the second position (FIG. 4), the rear edge of plate 30 can be lowered by withdrawing the rear latching mechanism 34 and pivoting the plate 30 around axis q as provided by the rods of front latching mechanism 36. With the rear edge plate 30 in a lowered position p' maintenance access can be provided to the underside of chaffer sieve 14 through opening 57.

A lever 70 may be provided to allow an operator to pivot the plate 30 between the various positions described, the lever 70 being accessible from outside of the shaker frame 21.

Although described as being pivotable between the various configurations, plate 30 may be moveable through other means such as translation wherein the plate 30 is guided upwardly and downwardly by rails for example.

The rear latching mechanism 34 provides a hinge-like connection between the plate 30 and the shaker frame 21 wherein the rods thereof define pivot axis p. In an alternative arrangement, the retractable latching mechanism 34 may be omitted and replaced with a simple hinge mechanism which defines the pivot axis p.

Although as described as comprising a pair of coupled rods, the latching mechanisms 34, 36 may take many different constructions as will be appreciated by a person skilled in the art. For example, simple bolts may be provided at each side to secure the plate 30 in position. Alternatively, pins may be inserted from outside of the shaker frame 21 to secure the plate 30 in position.

In summary, there is provided a grain cleaning system in a combine harvester comprises a frame, a chaffer sieve, and a lower sieve. A clean grain chute is located under the lower sieve to catch grain falling therefrom and is inclined to direct the caught grain to a clean grain trough. A tailings return chute is disposed under the clean grain chute and is configured to direct tailings to a tailings collection trough. A multi-configurable plate is mounted to the frame and positioned under a rear portion of the chaffer sieve. The plate is moveable between different operating positions. In a first operating position the plate is configured to guide material incident thereon to the tailings return chute. In a second operating position the plate is configured to guide material incident thereon to the clean grain chute.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the spirit and principles of the disclosure.

The invention claimed is:

1. A grain cleaning system in a combine harvester comprising:
    a frame;
    a chaffer sieve operable to convey harvested crop material in a generally rearward direction to a first discharge edge;
    a lower sieve arranged below the chaffer sieve to catch material falling through the chaffer sieve and being operable to convey caught crop material in a generally rearward direction to a second discharge edge located forwardly and below the first discharge edge;
    a first chute disposed under the lower sieve to catch grain falling therefrom and being inclined to direct the caught grain to a clean grain trough;
    a second chute disposed under the first chute and configured to direct tailings to a tailings collection trough; and
    a multi-configurable plate mounted to the frame and positioned under a rear portion of the chaffer sieve, wherein the plate is moveable between a first operating position in which the plate is configured to guide material incident thereon to the second chute, and a second operating position in which the plate is configured to guide material incident thereon to the first chute, wherein the plate is pivotally mounted to the frame at a first pivot axis, and wherein the plate is pivotable between the first and second operating positions around the first pivot axis, wherein the plate is pivotable into a third position in which a front edge of the plate is raised beyond the second operating position so as to present an access opening to the lower sieve for inspection.

2. The grain cleaning system according to claim 1, wherein the first pivot axis is proximate to a rear edge of the plate.

3. The grain cleaning system according to claim 1, wherein the plate is hinged to the frame at the first pivot axis.

4. The grain cleaning system according to claim 1, wherein the frame comprises a pair of side walls between which the chaffer sieve, lower sieve, first chute and second chute are disposed.

5. The grain cleaning system according to claim 4, wherein a front latching mechanism is provided to selectively latch the plate to at least one of said side walls in both of the first and second operating positions.

6. The grain cleaning system according to claim 5, wherein the front latching mechanism comprises a laterally shiftable locking member which engages with one of said side walls.

7. The grain cleaning system according to claim 2, wherein the front latching mechanism fastens the plate to the side walls so as to provide a second pivot axis which is proximate to the front edge of the plate, and wherein a rear latching mechanism is provided to latch the plate to at least one of said side walls and permit pivoting around the first pivot axis when the rear latching mechanism is engaged, wherein the rear edge of the plate can be pivoted around the second pivot axis into a fourth position by withdrawing the rear latching mechanism.

8. The grain cleaning system according to claim 1, further comprising an external user-operable lever coupled to the plate for moving the plate between the first and second operating positions.

* * * * *